United States Patent
Aoshima et al.

(10) Patent No.: US 9,761,261 B2
(45) Date of Patent: Sep. 12, 2017

(54) MAGNETIC RECORDING MEDIUM AND MAGNETIC COATING COMPOSITION FOR MAGNETIC RECORDING MEDIUM

(71) Applicant: FUJIFILM Corporation, Minato-ku, Tokyo (JP)

(72) Inventors: Toshihide Aoshima, Minami-ashigara (JP); Wataru Kikuchi, Minami-ashigara (JP); Kazutoshi Katayama, Minami-ashigara (JP); Tatsuo Mikami, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 5 days.

(21) Appl. No.: 14/673,144

(22) Filed: Mar. 30, 2015

(65) Prior Publication Data
US 2015/0279404 A1    Oct. 1, 2015

(30) Foreign Application Priority Data

Mar. 31, 2014 (JP) .............................. 2014-074679
Sep. 17, 2014 (JP) .............................. 2014-188522

(51) Int. Cl.
| | |
|---|---|
| G11B 5/708 | (2006.01) |
| G11B 5/702 | (2006.01) |
| G11B 5/714 | (2006.01) |
| G11B 5/70 | (2006.01) |

(52) U.S. Cl.
CPC .......... *G11B 5/7021* (2013.01); *G11B 5/7013* (2013.01); *G11B 5/7023* (2013.01); *G11B 5/714* (2013.01)

(58) Field of Classification Search
CPC ... G11B 5/7013; G11B 5/7021; G11B 5/7023; G11B 5/714
See application file for complete search history.

(56) References Cited

U.S. PATENT DOCUMENTS 5,418,309 A * 5/1995 Tanabe ............... C08G 18/4211
                                                 524/904
5,439,988 A * 8/1995 Moens ................. C08G 63/199
                                                 525/437
2010/0021771 A1* 1/2010 Yamazaki .............. B82Y 30/00
                                                 428/842.8
2011/0003241 A1* 1/2011 Kaneko ............... C08G 73/0206
                                                 430/7
2012/0129995 A1* 5/2012 Pirrung ..................... C08F 2/20
                                                 524/289

FOREIGN PATENT DOCUMENTS

JP     2004-067941 A    3/2004

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium, which comprises a magnetic layer comprising ferromagnetic powder and binder on a nonmagnetic support, wherein the magnetic layer further comprises a compound which has a weight average molecular weight of equal to or more than 1,000 but less than 20,000 and is denoted by formula (1):

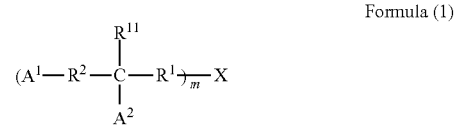

Formula (1)

wherein, in formula (1), $A^1$ denotes a monovalent polymer group, each of $R^1$ and $R^2$ independently denotes a single bond or a divalent connecting group, $R^{11}$ denotes a hydrogen atom or a monovalent substituent, m denotes an integer of equal to or greater than 2, multiple instances of $R^1$, $R^2$, $A^1$, and $R^{11}$ that are present can be identical or different, $A^2$ denotes a hydrogen atom or a monovalent substituent denoted by —$OR^3$—Z, $R^3$ denotes a single bond or a divalent connecting group, Z denotes a monovalent acid group, among multiple instances of $A^2$ that are present, at least one denotes a monovalent group denoted by —O—$R^3$—Z, and X denotes a connecting group of valence m.

15 Claims, No Drawings

MAGNETIC RECORDING MEDIUM AND MAGNETIC COATING COMPOSITION FOR MAGNETIC RECORDING MEDIUM

CROSS-REFERENCE TO RELATED APPLICATIONS

This application claims priority under 35 U.S.C 119 to Japanese Patent Application No. 2014-074679 filed on Mar. 31, 2014 and Japanese Patent Application No. 2014-188522 filed on Sep. 17, 2014. Each of the above applications is hereby expressly incorporated by reference, in its entirety.

BACKGROUND OF THE INVENTION

Field of the Invention

The present invention relates to a magnetic recording medium and a magnetic coating composition for a magnetic recording medium.

Discussion of the Background

Particulate magnetic recording media (also referred to as simply "magnetic recording media" hereinafter) are normally fabricated by coating a magnetic coating composition comprising ferromagnetic powder and binder on a nonmagnetic support, either directly or indirectly via another layer such as a nonmagnetic layer, and conducting a curing treatment such as heating or irradiation with light as needed to form a magnetic layer.

Conventionally, binders have played an important role in enhancing the dispersion of ferromagnetic powder and the durability of the magnetic layer in particulate magnetic recording media. As a result, various research has been conducted on binders (for an example, see Japanese Unexamined Patent Publication (KOKAI) No. 2004-67941, which is expressly incorporated herein by reference in its entirety).

As stated in Japanese Unexamined Patent Publication (KOKAI) No. 2004-67941, polar groups such as sulfonate groups have been incorporated into binder to enhance the dispersion of ferromagnetic powder. The introduction of polar groups into binder has been conducted to increase dispersion by causing the binder to effectively adsorb to the surface of ferromagnetic powder. However, as is described in paragraph 0026 of Japanese Unexamined Patent Publication (KOKAI) No. 2004-67941, the introduction of an excessive quantity of polar groups tends to decrease the dispersion of ferromagnetic powder. Accordingly, it has proven difficult to achieve an adequate improvement in the dispersion of ferromagnetic powder by introducing polar groups into binder.

The use of resins with good mechanical properties as binder in the magnetic layer has been examined to enhance the durability of the magnetic layer. In this regard, Japanese Unexamined Patent Publication (KOKAI) No. 2004-67941 proposes using a prescribed copolymerization component such as an aromatic polyisocyanate to increase the concentration of urethane groups in order to enhance the mechanical properties of the polyurethane resin that is used as binder in the magnetic layer. As stated in paragraph 0025 of Japanese Unexamined Patent Publication (KOKAI) No. 2004-67941, the higher the concentration of urethane groups of the resin that is used as binder, the better the mechanical properties that can be achieved in the resin. However, solubility decreases. As a result, dispersion of the ferromagnetic powder tends to decrease. Thus, Japanese Unexamined Patent Publication (KOKAI) No. 2004-67941 states in paragraph 0025 that the concentration of urethane groups is to be in a range that permits good dispersion of ferromagnetic powder.

Even greater durability has been required of the magnetic layer in recent years. Reasons for this include the fact that the market has demanded ever higher properties and the size of ferromagnetic powder has been decreasing. For example, properties required by the market in recent years have included high durability in continuous running over longer periods with higher reliability than in the past. Since the magnetic force per bit has weakened accompanying the reduction in particle size of ferromagnetic powder, the distance between the reproduction head and the surface of the magnetic recording medium (magnetic layer) has tended to decrease in order to read information from such bits. Thus, the frequency of contact between the reproduction head and the surface of the magnetic recording medium (magnetic layer) has increased in recent years. Accordingly, magnetic recording media have come to be used in states where the surface of the magnetic layer is more prone to being scratched than in the past.

Accordingly, it is conceivable to enhance the mechanical properties of the resin that is employed as binder in the magnetic layer, as has been examined in the past, to increase the durability of the magnetic layer. However, as set forth above, the better the mechanical properties of the binder are rendered to enhance the durability of the magnetic layer, the poorer the dispersion property of the ferromagnetic powder tends to be. That is, achieving both the greater durability of the magnetic layer that has been demanded in recent years along with better dispersion of ferromagnetic powder will be difficult with binders such as those that have been conventionally employed.

SUMMARY OF THE INVENTION

Accordingly, an aspect of the present invention provides for a new means for achieving greater dispersion of ferromagnetic powder and greater durability of the magnetic layer in magnetic recording media.

The present inventors conducted extensive research. This resulted in the discovery tha, with the compound denoted by formula (1) below having a weight average molecular weight of equal to or more than 1,000 but less than 20,000 as a magnetic layer component along with ferromagnetic powder and binder, it was possible to achieve both better dispersion of ferromagnetic powder and greater durability of the magnetic layer.

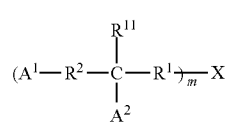

Formula (1)

wherein, in formula (1), $A^1$ denotes a monovalent polymer group, each of $R^1$ and $R^2$ independently denotes a single bond or a divalent connecting group, $R^{11}$ denotes a hydrogen atom or a monovalent substituent, m denotes an integer of equal to or greater than 2, multiple instances of $R^1$, $R^2$, $A^1$ and $R^{11}$ that are present can be identical or different, $A^2$ denotes a hydrogen atom or a monovalent substituent denoted by $-O-R^3-Z$, $R^3$ denotes a single bond or a divalent connecting group, Z denotes a monovalent acid group, among multiple instances of $A^2$ that are present, at least one denotes a monovalent group denoted by —O—$R^3$—Z, and X denotes a connecting group of valence m.

The following is conjecture by the present inventors and is not intended to limit the present invention in any way. The present inventors believe that the above compound, by having an acid group (Z in formula (1)) that is capable of adsorbing to the surface of ferromagnetic powder and a polymer group (a structure that is capable of functioning as a steric repulsion group) in the form of $A^1$ in combination, contributes to enhancing the dispersion property of ferromagnetic powder. More particularly, they believe that effective adsorbing of the acid group to the surface of ferromagnetic powder and prevention of the particle-aggregation by the presence of $A^1$ are the reasons why the enhanced dispersion of ferromagnetic powder is achieved by means of the above compound.

In terms of durability of the magnetic layer, since the above compound is not a compound being polymeric to the same degree as the resins that are employed as binders, it is thought to play the role of a plasticizer in the magnetic layer. More particularly, it is conceivable that if the magnetic layer were simply to be imparted with great strength, it might become brittle and tend to rupture. The fact that the above compound plays the role of a plasticizer and imparts a suitable degree of extensibility to the magnetic layer is presumed by the present inventors to contribute to enhancing the durability of the magnetic layer.

The present invention was devised based on the above discoveries.

One aspect of the present invention relates to a magnetic recording medium, which comprises a magnetic layer comprising ferromagnetic powder and binder on a nonmagnetic support, wherein the magnetic layer further comprises a compound which has a weight average molecular weight of equal to or more than 1,000 but less than 20,000 and is denoted by formula (1).

A further aspect of the present invention relates to:

a magnetic coating composition, which is a magnetic coating composition for a magnetic recording medium and comprises:

ferromagnetic powder;
binder;
solvent; and
a compound which has a weight average molecular weight of equal to or more than 1,000 or more but less than 20,000 and is denoted by formula (1) set forth above.

In one embodiment, the binder has a weight average molecular weight ranging from 20,000 to 120,000.

In one embodiment, in formula (1), the monovalent acid group denoted by Z is a carboxyl group, carboxyl salt group, sulfonic acid group, or sulfonate group.

In one embodiment, in formula (1), $A^1$ denotes a monovalent polymer group having a polyester structure.

In one embodiment, in formula (1), the connecting group of valence m denoted by X contains a structure selected from the group consisting of a cyclic structure and a branched structure.

In one embodiment, in formula (1), each of $R^1$, $R^2$, and $R^3$ independently denotes an alkylene group.

In one embodiment, the ferromagnetic powder has an average particle size ranging from 10 nm to 50 nm.

In one embodiment, the above compound is incorporated in a quantity of 0.5 to 50 weight parts per 100 weight parts of ferromagnetic powder.

In one embodiment, the binder is selected from the group consisting of polyurethane resin and vinyl chloride resin.

In one embodiment, the magnetic coating composition for magnetic recording media contains solvent in the form of ketone solvent.

According to an aspect of the present invention, it is possible to achieve both improved dispersion of ferromagnetic powder and improved durability of the magnetic layer.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic recording medium according to an aspect of the present invention has a magnetic layer comprising ferromagnetic powder and binder on a nonmagnetic support, with the magnetic layer further comprising a compound denoted by formula (1) and having a weight average molecular weight of equal to or more than 1,000 but less than 20,000.

The above compound contained in the magnetic layer of the magnetic recording medium contributes to enhancing dispersion of the ferromagnetic powder. The magnetic layer containing this compound also exhibits excellent durability (more particularly, being hard to be scratched and good resistance to scratching).

The magnetic coating composition for magnetic recording media according to an aspect of the present invention comprises a compound denoted by formula (1) having a weight average molecular weight of equal to or more than 1,000 but less than 20,000, ferromagnetic powder, binder, and solvent.

The magnetic coating composition for magnetic recording media can be employed as a coating liquid for forming the magnetic layer of the magnetic recording medium according to an aspect of the present invention, or used to prepare a coating liquid for forming a magnetic layer.

The above magnetic recording medium and magnetic coating composition for magnetic recording media (also referred to as the "composition" hereinafter) will be described in greater detail below. In the present invention, the word "to" denotes a range including a minimum and a maximum in the form of the numerical values that precede and succeed it, respectively.

<Compound Denoted by Formula (1) and Having a Weight Average Molecular Weight of Equal to or More than 1,000 but Less than 20,000>
(Details of Formula (1))

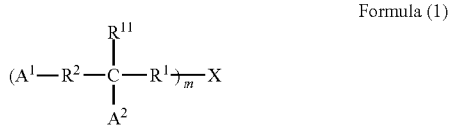

Formula (1)

(In formula (1), $A^1$ denotes a monovalent polymer group, each of $R^1$ and $R^2$ independently denotes a single bond or a divalent connecting group, $R^{11}$ denotes a hydrogen atom or a monovalent substituent, m denotes an integer of equal to or greater than 2, multiple instances of $R^1$, $R^2$, $A^1$, and $R^{11}$ that are present can be identical or different, $A^2$ denotes a hydrogen atom or a monovalent substituent denoted by —O—$R^3$—Z, $R^3$ denotes a single bond or a divalent connecting group, Z denotes a monovalent acid group, among multiple instances of $A^2$ that are present, at least one denotes a monovalent group denoted by —O—$R^3$—Z, and X denotes a connecting group of valence m.)

Formula (1) will be further described below.

In formula (1), $A^1$ denotes a monovalent polymer group. Here, the term "monovalent polymer group" denotes a monovalent substituent having a structure consisting of a polymer (with the term polymer including homopolymers and copolymers) from which a terminal group has been removed, formed by bonding two or more units of identical structure or of two or more different structures. Such groups are thought to function as steric repulsion groups, which the present inventors believe inhibits aggregation of particles of ferromagnetic powder and contributes to enhancing the dispersion of the ferromagnetic powder. The number of structural units contained in the above monovalent polymer group is, for example, 2 to 60, desirably 3 to 30, and preferably, 3 to 20. In formula (1), since m denotes an integer of equal to or more than 2, the compound denoted by formula (1) contains two or more instances of $A^1$. These two or more instances of $A^1$ can be identical or different.

The monovalent polymer group denoted by $A^1$ can be a monovalent substituent obtained by removing a terminal group from a known polymer. It suffices for this polymer (the term "polymer" will be used hereinafter with the both the meaning of polymer (homopolymer) and copolymer) to be a known polymer, and is not specifically limited. Examples of desirable polymers are at least one member selected from the group consisting of ester polymers, ether polymers, urethane polymers, vinyl monomer polymers and copolymers, amide polymers, epoxy polymers, silicone polymers, modified products thereof, and copolymers thereof (such as polyether/polyurethane copolymers and polyether/vinyl monomer polymers and copolymers (which can be any form among random copolymers, block copolymers, and graft copolymers)). One or more member selected from the group consisting of ester polymers, ether polymers, urethane polymers, vinyl monomer polymers and copolymers, modified products thereof, and copolymers thereof are preferred, and ester polymers are of greater preference. That is, the monovalent polymer group denoted by $A^1$ in formula (1) desirably has a polyester structure comprising two or more structural units containing ester bonds.

The polyester structure can comprise a combination of one or two or more linear, branched, or alicyclic hydrocarbon groups and aromatic hydrocarbon groups incorporated into a structural unit comprising an ester bond. More particularly, an example of a polyester structure is a structure from which a terminal group such as a hydrogen atom has been removed from a polyester comprising an aromatic hydrocarbon group in a structural unit comprising an ester bond, such as polyethylene naphthalate, polyethylene terephthalate, or the residue of a polyester containing a linear hydrocarbon group in a structural unit containing an ester bond, obtained by ring-opening polymerization of a lactone compound. Examples of the lactone compound are ε-caprolactone, δ-caprolactone, β-propiolactone, γ-butyrolactone, δ-valerolactone, γ-valerolactone, enantholactone, β-butyrolactone, γ-hexanolactone, γ-octanolactone, δ-hexanolactone, δ-octanolacone, δ-dodecanolactone, α-methyl-γ-butyrolactone, and lactides. In particular, ε-caprolactone, a lactide, or δ-valerolactone is desirable from the perspective of reaction properties and availability. However, there is no restriction thereto, and any lactone compound that will yield a polyester by ring-opening polymerization will suffice.

In formula (1), each of $R^1$ and $R^2$ independently denotes a single bond or a divalent connecting group. Since m denotes an integer of equal to or more than 2 in formula (1), two or more instances of each of $R^1$ and $R^2$ are normally contained in the compound denoted by formula (1). The two instances of $R^1$ and $R^2$ that are contained can be identical or different. Examples of divalent connecting groups are divalent connecting groups comprised of a combination of one or more members selected from the group consisting of linear, branched, and cyclic alkylene groups; linear, branched, and cyclic alkenylene groups; —C(=O)—; —O—; arylene groups; and halogen atoms. More specific examples are divalent connecting groups comprised of a combination of one or more members selected from the group consisting of linear, branched, and cyclic alkylene groups having 1 to 12 carbon atoms; linear, branched, and cyclic alkenylene groups having 1 to 6 carbon atoms; —C(=O)—; —O—; phenylene groups; and halogen atoms. The divalent connecting group is desirably a divalent connecting group comprised of 1 to 10 carbon atoms, 0 to 10 oxygen atoms, 0 to 10 halogen atoms, and 1 to 30 hydrogen atoms. Specific examples are the structures given below. In the structures given below, * denotes the position of a bond with another structure. The present invention is not limited to the specific examples given below.

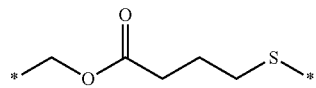

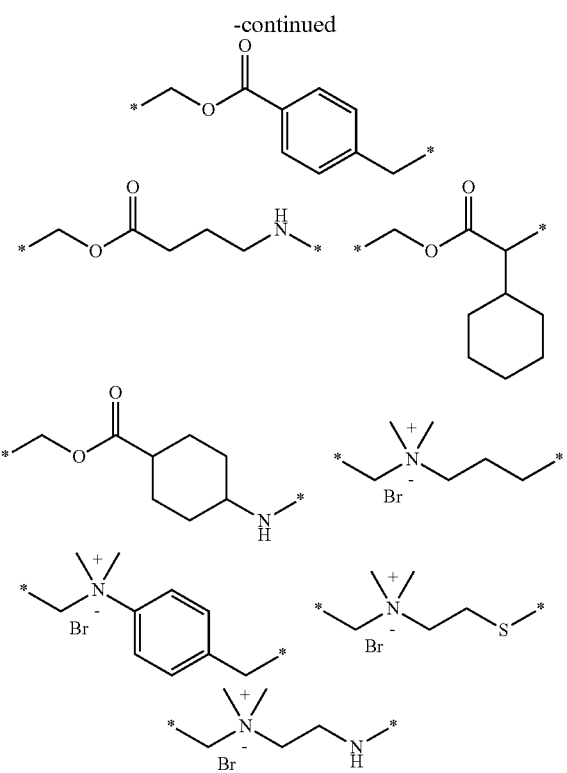

Each of $R^1$ and $R^2$ independently desirably denotes an alkylene group, preferably denotes an alkylene group with 1 to 12 carbon atoms, more preferably denotes an alkylene group with 1 to 5 carbon atoms, and still more preferably, denotes an unsubstituted alkylene group with 1 to 5 carbon atoms.

In the present invention, unless specifically stated otherwise, the groups that are described can be substituted or unsubstituted. When a given group comprises a substituent, examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino group, nitro groups, acyl groups, and carboxyl groups. The "number of carbon atoms" of a group having a substituent means the number of carbon atoms of the portion excluding the substituent.

In formula (1), $R^{11}$ denotes a hydrogen atom or a monovalent substituent. The above substituents can serve as examples of monovalent substituents. An alkyl group is desirable, an alkyl group having 1 to 6 carbon atoms is preferred, and a methyl group or an ethyl group is of greater preference. Even more preferably, $R^{11}$ is a hydrogen atom.

In formula (1), m denotes an integer of equal to or more than 2, desirably an integer ranging from 2 to 10, preferably an integer ranging from 2 to 8, more preferably an integer ranging from 2 to 5, and still more preferably, 3 or 4.

In formula (1), X denotes a connecting group of valence m. m is as set forth above.

Examples of the connecting group of valence m denoted by X are divalent connecting groups comprised of combinations of one or two or more members selected from the group consisting of —C(=O)—O—, —O—, —C(=O)—NR— (where R denotes a hydrogen atom or an alkyl group with 1 to 4 carbon atoms), —O—C(=O)—NH—, phenylene groups, and alkylene group having 1 to 30 carbon atoms. $R^1$ can include a cyclic structure within a structure comprised of a combination of two or more members selected from the above group. The connecting group of valence m denoted by X desirably comprises one or two or more structures selected from the group consisting of cyclic structures and branched structures. The presence of such a structure is presumed by the present inventors to contribute to increasing dispersion of the ferromagnetic powder.

Specific examples of the connecting group denoted by X are the structures given by way of example below. Among the structures given below, * denotes the position of a bond within another structure. However, the present invention is not limited to the specific examples given below.

In formula (1), $A^2$ denotes a hydrogen atom or a monovalent substituent represented by —O—$R^3$—Z. Here, $R^3$ denotes a divalent connecting group and Z denotes a monovalent acid group. Since in formula (1), m denotes an integer of equal to or more than 2, in formula (1), multiple (two or more) instances of $A^2$ are present. At least one of the multiple instances of $A^2$ that are present is a monovalent substituent denoted by —O—$R^3$—Z. The present inventors presume that by having at least one of the multiple instances of $A^2$ that are present in the compound denoted by formula (1) comprise the above acid group contributes to enhancing dispersion of the ferromagnetic powder.

In formula (1), at least one of the multiple instances of $A^2$ that are present is the above monovalent substituent, two or more are desirably the above monovalent substituents, and all of the multiple instances of $A^2$ that are present are preferably the above monovalent substituents.

In the above monovalent —O—$R^3$—Z, Z denotes an acid group. Here, the term "acid group" refers to a group that releases $H^+$ in water or in a water-containing solvent (aqueous solvent) and dissociates into an anion. Z is not specifically limited beyond that it be an acid group. Examples are carboxyl groups, sulfonic acid groups, sulfuric acid groups, phosphoric acid groups, and salts thereof. From the perspective of further enhancing dispersion, carboxyl groups, sulfonic acid groups, sulfuric acid groups, phosphoric acid groups, and salts thereof are desirable. Here, the salt of a carboxylic acid group (—COOH) means a carboxyl salt group such that M in —COOM denotes a cation such as an alkali metal ion. The same applies to the other acid groups given by way of example above. The acid group is preferably a carboxyl group, carboxyl salt group, sulfonic acid group, or sulfonate group.

$R^3$ denotes a single bond or a divalent connecting group. The divalent connecting group is as described for the divalent connecting groups denoted by $R^1$ and $R^2$.

(Weight Average Molecular Weight)

The above compound is denoted by formula (1) and has a weight average molecular weight of equal to or more than 1,000 but less than 20,000. Since this compound has a molecular weight that is lower than the binders that are commonly employed in the magnetic layer, the present inventors believe that it contributes by playing a role as a plasticizer. For that reason, the weight average molecular weight of the compound is desirably 12,000 or less and preferably 9,000 or less. The compound denoted by formula (1) is of greater molecular weight than the usual low molecular weight compounds because it contains above-described $A^1$. For this reason, the weight average molecular weight of the compound denoted by formula (1) is not less than 1,000, is desirably not less than 1,500, and is preferably not less than 2,000. In the present invention, the term "weight average molecular weight" refers to a value that is measured by gel permeation chromatography (GPC) and converted based on the standard polystyrene.

Specific examples of this compound are the various compounds given in the Examples farther below.

(Synthesis Methods)

The compound set forth above can be synthesized by known methods. An example of a synthesis method is a method comprising the steps of:

conducting a ring-opening reaction with a multifunctional epoxy compound the mother nucleus structure of which has been substituted with two or more epoxy groups and a polymer providing $A^1$ to obtain an open-ring adduct having $A^1$ and hydroxyl groups; and modifying the open-ring adduct with an acid anhydride to convert at least one of the hydroxyl groups of the open-ring adduct to the monovalent substituent denoted by Z above and obtain an acid anhydride modified product.

Examples of the multifunctional epoxy compound are various compounds comprising the structure denoted by X above as a partial structure along with two or more epoxy groups. Specific examples are the compounds employed in the Examples, described farther below, but there is no limitation thereto.

The polymer that is subjected to the ring-opening addition reaction with the multifunctional epoxy compound is as described above for $A^1$. This polymer desirably has a weight average molecular weight of not less than 1,000 but less than 20,000. The weight average molecular weight thereof preferably falls within a range of 1,000 to 10,000, and more preferably, within a range of 2,000 to 8,000.

When, for example, the terminal functional group of the polymer is carboxylic acid, the carboxylic acid is mixed in a ratio of 0.9 to 1.2 mols per epoxy group equivalent of the epoxy groups of the resin having two or more epoxy groups per molecule and the open-ring addition reaction of the multifunctional epoxy compound and the polymer is conducted without solvent, or in the presence of an organic solvent with a relatively high boiling point of equal to or higher than 80° C. as needed, and in the presence of a reaction catalyst such as a tertiary amine or a quaternary ammonium salt, by heating and stirring for about 3 to 12 hours.

Any of the compounds providing an acid group that have been set forth above can be employed without restriction as the acid anhydride reacting with the open-ring adduct that is obtained. Examples are carboxylic anhydride and sulfonic anhydride. Specific examples are succinic anhydride, phthalic anhydride, 2,3-naphthalene dicarboxylic anhydride, other carboxylic anhydrides, 2-sulfobenzoic anhydride, tetrabromo-o-sulfobenzoic anhydride, and other sulfonic anhydrides.

For example, when employing phthalic anhydride, phthalic anhydride is mixed in a ratio of 0.9 to 1.2 mols per hydroxyl group equivalent and the reaction that modifies the open-ring adduct with an acid anhydride is conducted without solvent, or in the presence of an organic solvent with a boiling point of equal to or higher than 50° C. as needed, and in the presence of a reaction catalyst such as a tertiary amine or an inorganic base, by heating and stirring for about 3 to 12 hours.

Post-processing such as purifying can be conducted as needed following the various above reactions.

The above synthesis method is but a single example and is not to be construed as limiting the present invention in any way. Any known synthesis method permitting the synthesis of a compound denoted by formula (1) and having a weight average molecular weight falling within the above-stated range can be employed without restriction.

The above-described compound can be incorporated into the magnetic layer of a magnetic recording medium along with ferromagnetic powder and binder. The above-described compound can be incorporated into the composition according to an aspect of the present invention along with ferromagnetic powder, binder, and solvent. A single type of the above compound can be employed, or two or more types having different structures can be employed in combination. When employing two or more types in combination, the contents set forth below refer to the combined content of the compounds employed in combination. The same applies to the contents of the various components set forth farther below. From the perspective of enhancing dispersion of the ferromagnetic powder and the durability of the magnetic layer, the content of the above compound is desirably 0.5 weight part or more per 100 weight parts of ferromagnetic powder and preferably 1 weight part or more per 100 weight parts of ferromagnetic powder. To enhance the recording density, the increased fill ratio of the ferromagnetic powder in the magnetic layer is desirable. Because of this, the relative content of components other than ferromagnetic powder is desirably kept low. From this perspective, the content of the above compound is desirably equal to or less than 50 weight parts, preferably equal to or less than 40 weight parts, and more preferably, equal to or less than 30 weight parts per 100 weight parts of ferromagnetic powder.

<Binder>

Various resins that are commonly employed as binders in particulate magnetic recording media can be employed without restriction as the binder contained in the composition and in the magnetic recording medium according to an aspect of the present invention. For example, urethane resins, polyester resins, polyamide resins, vinyl chloride resins, acrylic resins obtained by the copolymerization of styrene, acrylonitrile, methyl methacrylate, and the like, cellulose resins such as nitrocellulose, epoxy resins, phenoxy resins, polyvinyl acetal, polyvinyl butyral, and other polyvinyl alkyral resins, either singly or mixed into compound resins, can be employed. Of these, desirable examples are polyurethane resins, acrylic resins, cellulose resins, and vinyl chloride resins. Preferred examples are polyurethane resins and vinyl chloride resins. These resins can also be employed as binders in the nonmagnetic layer, described farther below.

Reference can be made to Japanese Unexamined Patent Publication (KOKAI) No. 2010-24113, paragraphs 0028 to 0031, with regard to the above binders. The content of binder falls, for example, within a range of 5 to 50 weight parts, and desirably falls within a range of 10 to 30 weight parts, per 100 weight parts of ferromagnetic powder.

The compound set forth above is a compound with a relatively low molecular weight (weight average molecular weight ranging from not less than 1,000 but less than 20,000) relative to the resins that are commonly employed as binders. The present inventors presume that the fact that this compound plays a role as a plasticizer in the binder contributes to enhancing the durability of the mechanical layer. In combination with the above compound, the weight average molecular weight of the binder desirably falls within a range of 20,000 to 120,000, preferably falls within a range of 30,000 to 100,000, and more preferably, falls within a range of 30,000 to 60,000.

(Ferromagnetic Powder)

The ferromagnetic powder desirably has an average particle size of equal to or less than 50 nm. Ferromagnetic powder having an average particle size of equal to or less than 50 nm is capable of responding to the high density recording that has been required in recent years. Achieving a high degree of dispersion is not an easy task. By contrast, employing the above compound in combination makes it possible to improve dispersion of ferromagnetic powder having an average particle size of equal to or less than 50 nm. From the perspective of the stability of magnetization, the average particle size is desirably equal to or more than 10 nm, preferably equal to or more than 20 nm.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the above ferromagnetic powder is hexagonal ferrite powder. From the perspectives of achieving higher density recording and stable magnetization, the size of hexagonal ferrite powder is desirably an average plate diameter ranging from 10 nm to 50 nm, preferably 20 nm to 50 nm. For details regarding hexagonal ferrite powder, reference can be made to Japanese Unexamined Patent Publication (KOKAI) No. 2011-216149, paragraphs 0134 to 0136.

A specific desirable example of the ferromagnetic powder is ferromagnetic metal powder. From the perspectives of achieving high-density recording and stable magnetization, the size of ferromagnetic metal powder is desirably an average major axis length ranging from 10 nm to 50 nm, preferably 20 nm to 50 nm. Reference can be made to Japanese Unexamined Patent Publication (KOKAI) No. 2011-216149, paragraphs 0137 to 0141, for example, for details regarding ferromagnetic metal powders.

The content (fill ratio) of ferromagnetic powder in the magnetic layer desirably falls within a range of 50 to 90 weight percent, preferably within a range of 60 to 90 weight percent. A high fill rate is desirable from the perspective of achieving higher recording densities.

(Solvent)

Examples of the solvent that is contained along with the above-described components in the above composition are the organic solvents that are commonly employed to manufacture particulate magnetic recording media. Specific examples, in any ratio, are acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; esters such as methyl acetate, butyl acetate, isobutyl acetate, isopropyl acetate, ethyl lactate, and glycol acetate; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbontetrachloride, chloroform, ethylenechlorohydrin, dichlorobenzene, and other chlorinated hydrocarbons; and N,N-dimethyl formamide, hexane, and the like. Of these, the use of organic solvents containing ketones (ketone solvents) is desirable from the perspectives of the ability to dissolve the binders that are usually used in magnetic recording media and adsorption of the binder to the surface of the ferromagnetic powder. The ratio of the ketone solvent to the total quantity of solvent is desirably equal to or more than 60 weight percent, and can be 100 weight percent.

The organic solvent need not be 100% pure. It does not matter if isomers, unreacted material, by-products, decomposition products, oxides, moisture, and other impurities are contained in addition to the main components. These impurities desirably constitute equal to or less than 30 weight percent, preferably equal to or less than 10 weight percent. To enhance dispersion, somewhat strong polarity is desirable. In the solvent composition, equal to or more than 50 weight percent of solvent with a dielectric constant of equal to or higher than 15 is desirably contained. A solubility parameter of 8 to 11 is desirable. The quantity of solvent in the magnetic coating composition for magnetic recording media according to an aspect of the present invention is not specifically limited, and can be handled in the same manner as in the coating liquid for forming the magnetic layer in a common particulate magnetic recording medium.

The content of solvent in the above composition falls within a range of 100 to 800 weight parts, for example, and desirably falls within a range of 200 to 600 weight parts, per 100 weight parts of ferromagnetic powder.

(Other Components)

The above magnetic recording medium and composition can also optionally contain one or more known additives in addition to the components set forth above. Known additives can be added to the above composition and it can be used as a coating liquid for forming the magnetic layer. Examples of such additives are abrasives, lubricants, dispersants, dispersion adjuvants, fungicidal agents, electrostatic agents, oxidation inhibitors, carbon black, and the various additives that are commonly employed in forming particulate magnetic recording media. Additives can be suitably selected in the form of commercial products based on the properties desired.

The above composition can contain known curing agents. A magnetic layer that has been formed with a coating liquid for forming magnetic layers containing a curing agent will normally contain the crosslinked reaction product of binder and a curing agent. The use of a curing agent is desirable to increase the hardness of the magnetic layer. From the perspective of the crosslinking reactivity and the like, a curing agent in the form of polyisocyanate is desirable. Reference can be made to Japanese Unexamined Patent Publication (KOKAI) No. 2011-216149, paragraphs 0124 to 0125 for details regarding polyisocyanates. The curing agent can be added to the coating liquid for forming magnetic layers in a quantity of, for example, 0 to 80 weight parts, desirably 50 to 80 weight parts, per 100 weight parts of binder from the perspective of increasing the strength of the magnetic layer.

The above composition can be prepared by simultaneously admixing the various components set forth above, or by sequentially admixing them in any order. The method of preparing the composition is not specifically limited. Known techniques of preparing coating liquids for forming the magnetic layers of particulate magnetic recording media can be applied without restriction.

<Structure and Process of Manufacturing the Magnetic Recording Medium>

The structure and process of manufacturing the above magnetic recording medium are described in greater detail below.

(Magnetic Layer)

The magnetic layer can be formed by coating and drying the coating liquid for forming a magnetic layer directly on the surface of a nonmagnetic support, or on the surface of another layer such as a nonmagnetic layer that has been provided on the nonmagnetic support, and conducting treatments such as a heat treatment as needed. The various components contained in the magnetic layer and the composition that is used to form the magnetic layer are as set forth above.

(Nonmagnetic Layer)

Details of the nonmagnetic layer will be described next. In the magnetic recording medium, a nonmagnetic layer containing nonmagnetic powder and binder can be formed between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

The binders, lubricants, dispersing agents, and other additives, solvents, dispersion methods, and the like of the magnetic layer can be applied to the nonmagnetic layer. In particular, techniques that are known with regard to the magnetic layer can be applied to the quantity and type of binder and the quantities and types of additives and dispersing agents that are added. It is also possible to add carbon black and organic powders to the nonmagnetic layer. In that regard, reference can be made to Japanese Unexamined Patent Publication (KOKAI) No. 2010-24113, paragraphs 0040 to 0042, for example.

(Nonmagnetic Support)

Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, and heat treatment in advance. The surface roughness of a nonmagnetic support that can be employed is desirably a center average roughness Ra of 3 nm to 10 nm at a cutoff value of 0.25 mm.

(Layer Structure)

With regard to the thickness of the nonmagnetic support and each layer in the magnetic recording medium, the thickness of the nonmagnetic support is desirably 3 μm to 80 μm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied.

The thickness of the nonmagnetic layer is, for example, 0.1 μm to 3.0 μm, desirably 0.1 μm to 2.0 μm, and preferably 0.1 μm to 1.5 μm. The nonmagnetic layer in the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

(Backcoat Layer)

In the magnetic recording medium of an aspect of the present invention, a backcoat layer can be provided on the opposite surface of the nonmagnetic support from the surface on which the magnetic layer is present. The backcoat layer desirably contains carbon black and inorganic powder. The formula of the magnetic layer or nonmagnetic layer can be applied to the binder and various additives for forming the backcoat layer. The backcoat layer is desirably equal to or less than 0.9 μm, preferably 0.1 to 0.7 μm in thickness.

Manufacturing Process

The process of manufacturing coating liquids for forming the magnetic layer, nonmagnetic layer, and backcoat layer normally comprises at least a kneading step, dispersing step, and a mixing step, provided as needed before and/or after these steps. Each of these steps can be divided into two or more stages. All of the starting materials employed in an aspect of the present invention, such as the ferromagnetic powder, the above compound, nonmagnetic powder, binder, carbon black, abrasives, antistatic agents, lubricants, and solvents can be added either at the start of, or part way through, any step. Any of the starting materials can be divided up and added in two or more steps. For example, polyurethane can be divided up and added in the kneading step, dispersing step, and in a kneading step after the dispersing step for viscosity adjustment. To manufacture the magnetic recording medium of an aspect of the present invention, conventionally known manufacturing techniques can be employed. An apparatus with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse the magnetic layer coating liquid, nonmagnetic layer coating liquid, or backcoat layer coating liquid. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed. Reference can be made to Japanese Unexamined Patent Publication (KOKAI) No. 2010-24113, paragraphs 0051 to 0057, for details on methods of manufacturing the magnetic recording medium. The crosslinking reaction of the curing agent can proceed in the heating during the drying step and the calendering treatment. As needed, a separate heat treatment can also be conducted from the drying step and calendering treatment, as described in Japanese Unexamined Patent Publication (KOKAI) No. 2012-74097, which is expressly incorporated herein by reference in its entirety, paragraph 0055.

The magnetic recording medium according to an aspect of the present invention set forth above achieves both enhanced dispersion of the ferromagnetic powder and improved durability of the magnetic layer. The magnetic coating composition for magnetic recording media according to an aspect of the present invention can be applied to form such magnetic layers.

EXAMPLES

The present invention will be described more specifically below through Examples. However, the present invention is not limited to the forms disclosed in Examples. Unless specifically stated otherwise, the "parts" and "%" given below are based on weight.

The weight average molecular weight values given below were obtained by GPC measurement and polystyrene conversion.

The target compounds obtained by the synthesis methods set forth below were confirmed by $^1$H-NMR, GPC, and acid value measurement.

Synthesis of Compound 1

(Step A) Synthesis of Polyester (A-1)

In a 500 mL three-necked flask were mixed 16.8 g of n-octanoic acid (made by Wako Pure Chemical Industries, Ltd.), 100 g of ε-caprolactone (Praxel M, made by Daicel Corporation), and 6.0 g of monobutyltin oxide (made by Wako Pure Chemical Industries, Ltd.) (BuSn(O)OH) and the mixture was heated for one hour at 160° C. A 100 g quantity of ε-caprolactone was added dropwise over five hours and stirred for a further two hours. Subsequently, the mixture was cooled to room temperature, yielding polyester (A-1) (pCL15-Oct). A synthesis schematic is given below.

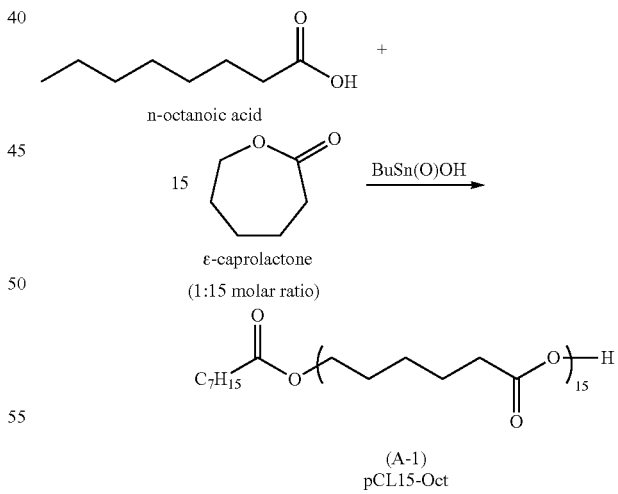

(Step B) Synthesis of Open-Ring Adduct (B-1)

In a 500 mL three-necked flask were mixed 11.6 g of triglycidyl isocyanurate (made by Tokyo Chemical Industry Co., Ltd.), 0.62 g of dimethyldodecylamine (made by Tokyo Chemical Industry Co., Ltd.), and 200 g of polyester (A-1) and the mixture was heated for 3 hours at 110° C., yielding open-ring adduct (B-1). A synthesis schematic is given below.

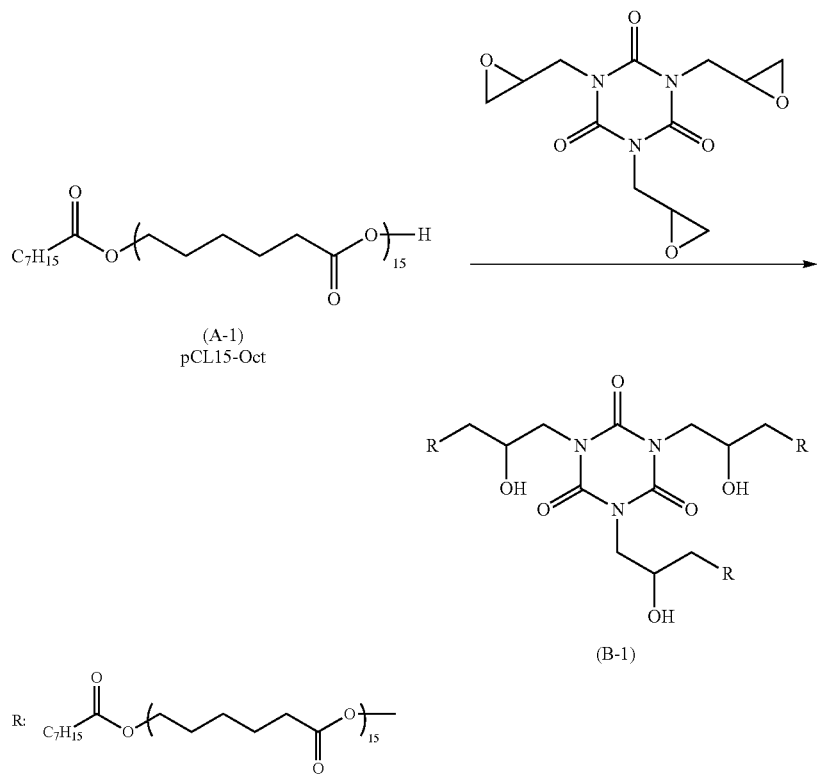

(Step C) Synthesis of Acid Anhydride-Modified Product (Component 1) of Open-Ring Adduct The reaction solution following the reaction of step B was cooled to 65° C., after which 200 g of a cyclohexanone solution containing 11.7 g of succinic anhydride (made by Tokyo Chemical Industry Co., Ltd.) in cyclohexanone was gradually added and the mixture was stirred for two hours. Subsequently, more cyclohexanone was added, yielding a 30% cyclohexanone solution of Compound 1 below. A synthesis schematic is given below.

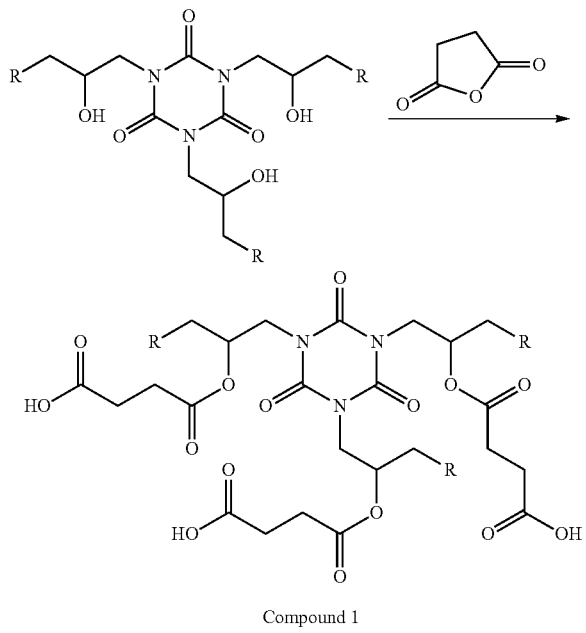

Compound 1

-continued

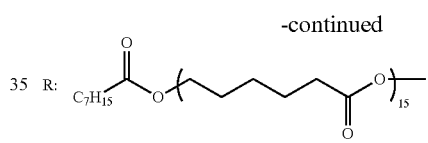

Synthesis of Compound 2

With the exception that step C was changed as indicated below, the same steps were implemented as in the synthesis of Compound 1 and the following 30% cyclohexanone solution of Compound 2 was obtained.

The reaction solution following the reaction of step B was cooled to 65° C., after which 200 g of a cyclohexanone solution containing 17.3 g of phthalic anhydride in cyclohexanone was gradually added and the mixture was stirred for two hours. Subsequently, more cyclohexanone was added, yielding a 30% cyclohexanone solution of Compound 2 below. A synthesis schematic is given below.

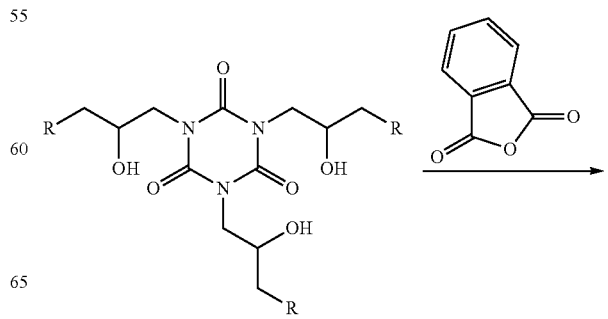

-continued

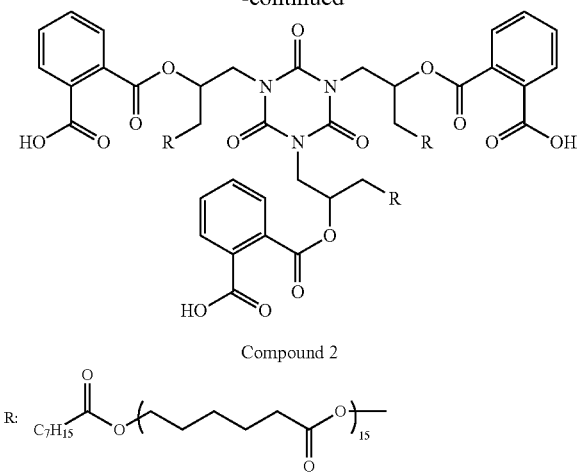

Compound 2

Synthesis of Compound 3

(Step A) Synthesis of Polyester (A-2)

In a 500 mL three-necked flask were mixed 63.2 g of n-octanoic acid, 200 g of ε-caprolactone, and 22.3 g of BuSn(O)OH) and the mixture was heated for one hour at 160° C. A 100 g quantity of ε-caprolactone was added dropwise over five hours and the mixture was stirred for another two hours. Subsequently, the mixture was cooled to room temperature, yielding polyester (A-2) (pCL4-Oct). A synthesis schematic is given below.

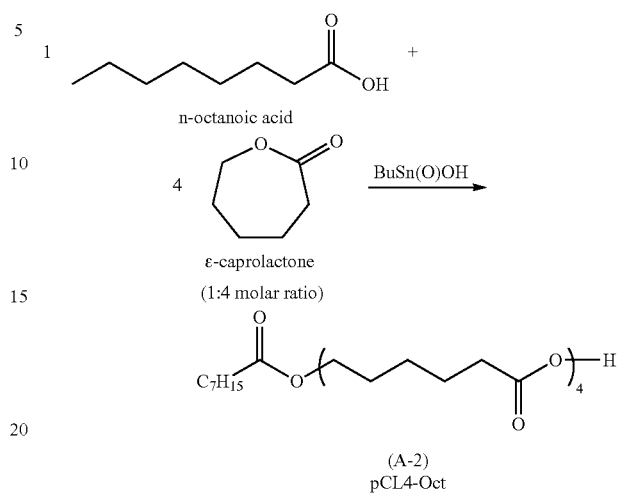

(Step B) Synthesis of Open-Ring Adduct (B-2)

In a 500 mL three-necked flask were mixed 24.9 g of trimethylolpropane triglycidyl ether (made by Tokyo Chemical Industry Co., Ltd.), 1.9 g of dimethyldodecylamine, and 200 g of polyester (A-1) and the mixture was heated for 3 hours at 110° C., yielding open-ring adduct (B-2). A synthesis schematic is given below.

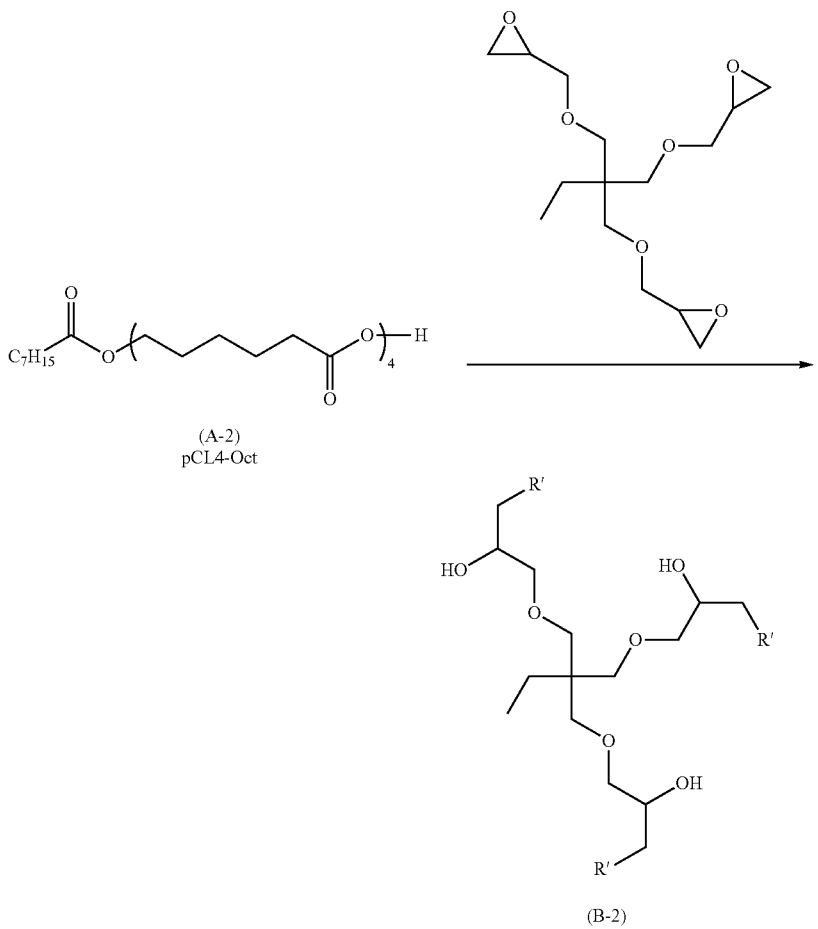

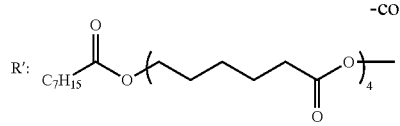

(Step C) Synthesis of Acid Anhydride-Modified Product (Compound 3) of Open-Ring Adduct The reaction solution following the reaction of step B was cooled to 65° C., after which 200 g of a cyclohexanone solution containing 35.1 g of succinic anhydride in cyclohexanone was gradually added and the mixture was stirred for two hours. Subsequently, more cyclohexanone was added, yielding a 30% cyclohexanone solution of Compound 3 below. A synthesis schematic is given below.

The reaction solution following the reaction of step B was cooled to 65° C., after which 200 g of a cyclohexanone solution containing 51.9 g of phthalic anhydride in cyclohexanone was gradually added and the mixture was stirred for two hours. Subsequently, more cyclohexanone was added, yielding a 30% cyclohexanone solution of Compound 4 below. A synthesis schematic is given below.

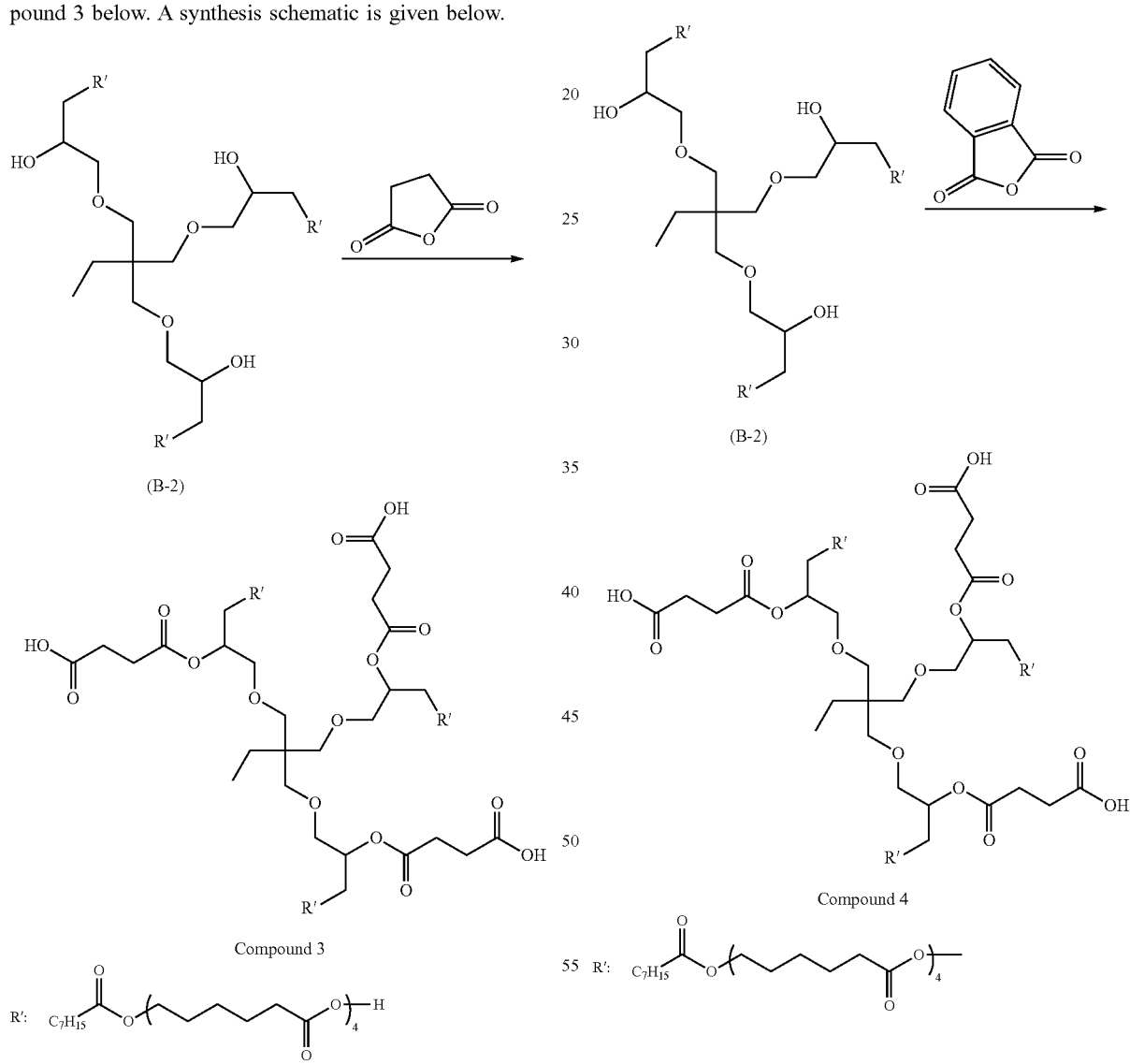

Synthesis of Compound 4

With the exception that step C was changed as indicated below, the same steps were implemented as in the synthesis of Compound 3 and the following 30% cyclohexanone solution of Compound 4 was obtained.

Synthesis of Compound 5

(Step A) Synthesis of Polyester (A-3)

In a 500 mL three-necked flask were mixed 19.2 g of n-octanoic acid, 100 g of δ-valerolactone, and 3.4 g of BuSn(O)OH) and the mixture was heated for one hour at 160° C. A 100 g quantity of δ-valerolactone was added dropwise over five hours and the mixture was stirred for another two hours. Subsequently, the mixture was cooled to room temperature, yielding polyester (A-3) (pVL15-Oct). A synthesis schematic is given below.

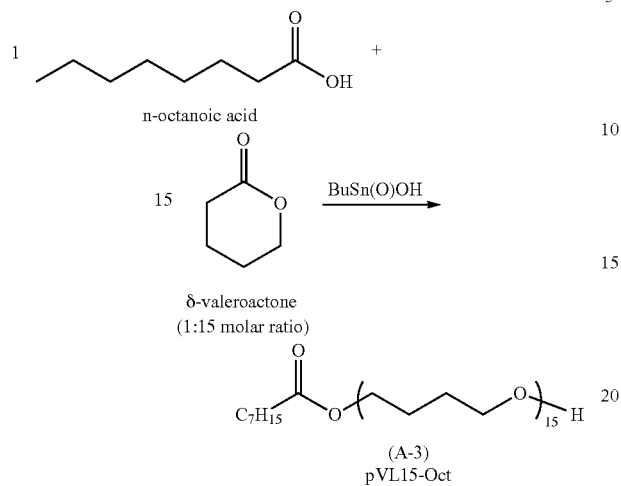

(A-3)
pVL15-Oct (Step B) Synthesis of Open-Ring Adduct (B-3)

An 11.5 g quantity of neopentyl glycol diglycidyl ether (made by Tokyo Chemical Industry Co., Ltd.), 0.58 g of dimethyldodecylamine, and 200 g of polyester (A-3) were mixed. The mixture was then heated for 3 hours at 110° C., yielding open-ring adduct (B-3). A synthesis schematic is given below.

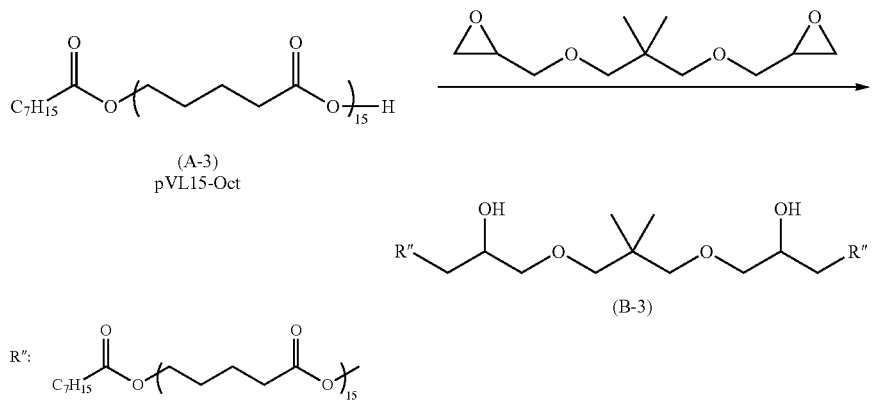

(Step C) Synthesis of Acid Anhydride-Modified Product (Compound 5) of Open-Ring Adduct Once the reaction solution following the reaction of step B had cooled to 65° C., 200 g of a cyclohexanone solution containing 10.8 g of succinic anhydride in cyclohexanone was gradually added and the mixture was stirred for 2 hours. Subsequently, cyclohexanone was again added, yielding a 30% cyclohexanone solution of Compound 5 below. A synthesis schematic is given below.

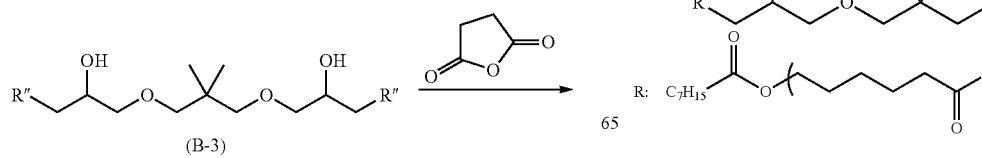

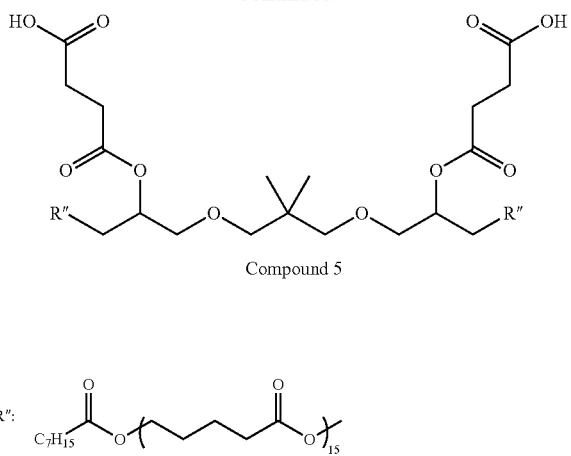

Compound 5

Synthesis of Compound 6

With the exception that polyester in the form of polyester (A-1) (pCL15′-Oct) was employed, the same steps were implemented as in the synthesis of Compound 5, yielding a 30% cyclohexanone solution of Compound 6 below.

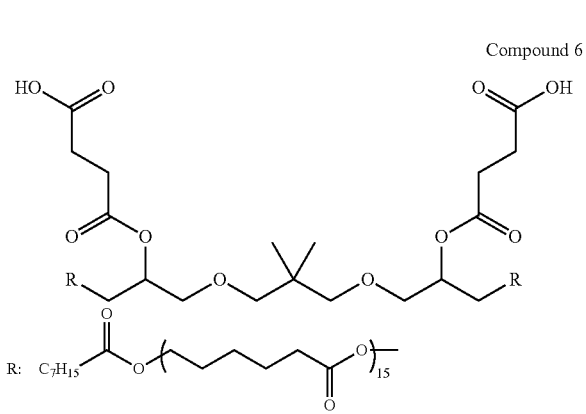

Compound 6

Synthesis of Compound 7

(Step B) Synthesis of Open-Ring Adduct (B-4)

Open-ring adduct (B-4) was obtained by the following method using polyester in the form of polyester (A-3) (pVL15-Oct).

A 12.5 g quantity of diglycidyl 1,2-cyclohexane dicarboxylate (made by Tokyo Chemical Industry Co., Ltd.), 0.62 g of dimethyldodecylamine, and 200 g of polyester (A-3) were heated for 3 hours at 110° C., yielding open-ring adduct (B-4). A synthesis schematic is given below.

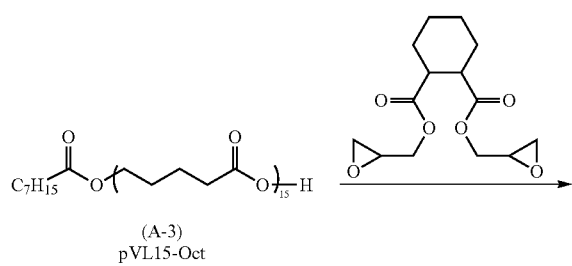

(Step C) Synthesis of Acid Anhydride-Modified Product (Compound 7) of Open-Ring Adduct Once the reaction solution following the reaction of step B had cooled to 65° C., 200 g of a cyclohexanone solution containing 11.7 g of succinic anhydride in cyclohexanone was gradually added and the mixture was stirred for 2 hours. Subsequently, cyclohexanone was again added, yielding a 30% cyclohexanone solution of Compound 7 below. A synthesis schematic is given below.

Synthesis of Compound 8 (Comparative Example 1)

In a 500 mL three-necked flask were mixed 4.2 g of n-octanoic acid, 100 g of ε-caprolactone (Praxel M, made by Daicel Corp.), and 0.74 g of monobutyltin oxide (made by Wako Pure Chemical Industries, Ltd.) (BuSn(O)OH) and the mixture was heated for one hour at 160° C. A 100 g quantity of ε-caprolactone was added dropwise over five hours and the mixture was stirred for another two hours. Subsequently, the mixture was cooled to room temperature, yielding polyester (A-4) (pCL60-Oct). A synthesis schematic is given below.

To 100 g of polyester (A-4) were added 1.55 g of glycidyl neopentylglycol diglycidyl ether (made by Tokyo Chemical Industry Co., Ltd.) and 0.08 g of dimethyldodecylamine (a catalyst) and the mixture was reacted for 5 hours at 110° C. Following the reaction, the reaction solution was cooled to 65° C., 240 g of a cyclohexanone solution containing 1.43 g of succinic anhydride in cyclohexanone was gradually added, and the mixture was stirred for 2 hours. Subsequently, cyclohexanone was again added, yielding a 30% cyclohexanone solution of Compound 8 below.

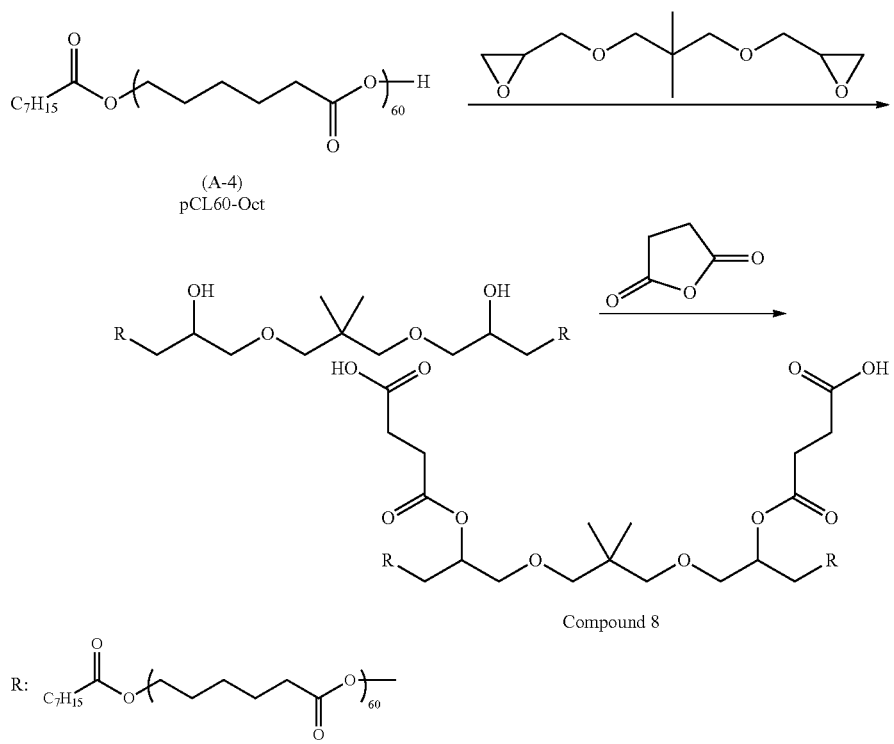

The weight average molecular weights of Compounds 1 to 8 synthesized by the methods set forth above are given in Table 1.

In each of the following steps, Compounds 1 to 8 were separated from the cyclohexanone solutions prepared above and employed.

[Preparation of Magnetic Coating Composition for Magnetic Recording Media]

<Formula of Composition>

| | |
|---|---|
| Ferromagnetic tabular hexagonal ferrite powder: Composition without oxygen (molar ratio): Ba/Fe/Co/Zn = 1/9/0.2/1 Hc: 160 kA/m (2,000 Oe) Average tabular diameter: 20 nm Average tabular ratio: 2.7 BET specific surface area: 60 m²/g σs: 46 A · m²/kg (46 emu/g) | 100 parts |
| Compound shown in Table 1: | 10 parts |
| Urethane resin (Vylon (registered trademark) UR4800 made by Toyobo Co., Ltd.; functional group: SO₃Na, functional group concentration: 70 eq/t, weight average molecular weight 70,000): | 4 parts |
| Vinyl chloride resin (MR104 made by Kaneka Corp., weight average molecular weight: 55,000): | 10 parts |
| α-Al₂O₃ (average particle size: 0.1 μm): | 8 parts |
| Carbon black (average particle size: 0.08 μm): | 0.5 parts |
| Cyclohexanone: | 110 parts |

<Preparation of Composition>

The various above components were kneaded in an open kneader and then dispersed in a sand mill. The following components were added to the dispersion obtained, the mixture was stirred, and an ultrasonic treatment was conducted. The mixture was filtered with a filter having a average pore size of 1 μm, yielding a magnetic coating composition for magnetic recording media.

| | |
|---|---|
| Butyl stearate: | 1.5 parts |
| Stearic acid: | 0.5 part |
| Stearamide: | 0.2 part |
| Methyl ethyl ketone: | 50 parts |
| Cyclohexanone: | 50 parts |
| Toluene: | 3 parts |
| Polyisocyanate compound (Coronate 3041 made by Nippon Polyurethane Industry Co., Ltd.): | 2.5 parts |

[Evaluation of Dispersion Property]

A 0.5 mL quantity of the composition prepared above was collected and diluted 25-fold with a mixed solvent of methyl ethyl ketone (MEK)/cyclohexanone=6/4 (by volume) to prepare a dispersion for evaluation. The transmittance at a wavelength of 450 nm of the dispersion was measured with a UV-3600 made by Shimadzu Corp. and evaluated on the following scale. The lower the dispersion, the greater the degree of aggregation or precipitation of the ferromagnetic powder in the liquid, and the higher the transmittance of the liquid (supernatant) became. Thus, the lower the transmittance, the better the dispersion was evaluated to be.

A: Transmittance 0 to 5.0%
B: Transmittance equal to or more than 5.1%

[Evaluation of Durability]

<Fabrication of Film for Evaluating Durability>

| | |
|---|---|
| Compound shown in Table 1: | 10 parts |
| Polyurethane resin: (Vylon (registered trademark) UR4800, made by Toyobo Corp.): | 4 parts |
| Vinyl chloride resin (MR104 made by Kaneka Corp.): | 10 parts |

The above components were mixed. The mixture obtained was cooled to 10° C. or lower. Once the mixture had been cooled, 5.0 weight parts of polyisocyanate (Coronate 3041 made by Nippon Polyurethane Industry Co., Ltd.) solution (solid fraction 2.5 parts, toluene 1.25 parts, and methyl ethyl ketone (2-butanone) 1.25 parts) were added. Cyclohexanone was then added and the mixture was dissolved to a solid fraction of 22%.

The composition for film fabrication prepared as set forth above was coated with a doctor blade having a gap of 300 μm on a base film (Torelina (registered trademark) film 3000 made by Toray) and dried under vacuum under conditions of 140° C. for 30 minutes. The dry film obtained was cooled to room temperature and then annealed under conditions of 100° C. for 2 days. Following annealing, the film was cooled to room temperature and separated from the base film to obtain a film for evaluating durability.

<Evaluation of Durability>

(Measurement of Rupture Energy)

The film for evaluating durability that was obtained was cut to a width of 6.35 mm and a chuck distance of 50 mm. The chuck distance of a strograph made by Toyobo Corp. (Toyoseiki Strograph V1-C) was set to 50 mm, the cut film sample was placed in position, and a film tensile test was conducted at 50 mm/min. Extension and stress were measured in the test.

The load (kgf) when the film ruptured was adopted as the weighting at rupture. The value obtained by calculating weighting at rupture÷film cross-sectional area (μm$^2$)×9.8 was adopted as the stress at rupture (MPa). The extension at the time of rupture was obtained as the extension at rupture.

The measured extension was plotted on the horizontal axis and the stress on the vertical axis to obtain an extension—stress curve. The points of intersection with the extension at rupture and the stress at rupture were adopted as end points, and the integral of the region thus defined was adopted as the rupture energy.

The greater the energy at rupture, the greater the film strength and the better the durability indicated.

[Fabrication and Evaluation of Magnetic Tape]

<Preparation of Nonmagnetic Layer Coating Liquid>

| | | |
|---|---|---|
| Nonmagnetic powder (αFe$_2$O$_3$ hematite): | | 80 parts |
| Average major axis length: | 0.15 μm | |
| BET specific surface area: | 52 m$^2$/g | |
| pH: | 6 | |
| Tap density: | 0.8 | |
| DBP oil absorption capacity: | 27 to 38 g/100 g | |
| Surface treatment agents: | Al$_2$O$_3$, SiO$_2$ | |
| Carbon black: | | 20 parts |
| Average particle size: | 0.020 μm | |
| DBP oil absorption capacity: | 80 mL/100 g | |
| pH: | 8.0 | |
| BET specific surface area: | 250 m$^2$/g | |
| Volatile content: | 1.5% | |
| Polyurethane resin: | | 19 parts |
| Branched side chain-comprising polyester polyol/diphenylmethane diisocanate —SO$_3$Na = 100 eq/ton | | |
| Methyl ethyl ketone: | | 150 parts |
| Cyclohexanone: | | 150 parts |

The various components of the above coating material was kneaded in an open kneader and then dispersed with a sand mill. The components listed below were admixed to the dispersion obtained, after which the mixture was filtered with a filter having a average pore size of 1 μm to prepare a nonmagnetic layer coating liquid.

| | |
|---|---|
| Butyl stearate: | 1.5 parts |
| Stearic acid: | 1 part |
| Methyl ethyl ketone: | 50 parts |

| | |
|---|---|
| Cyclohexanone: | 50 parts |
| Toluene: | 3 parts |
| Polyisocyanate compound (Coronate 3041 made by Nippon Polyurethane Industry Co., Ltd.): | 5 parts |

<Preparation of Back Coat Layer Coating Liquid>

| | |
|---|---|
| Carbon black (average particle size: 40 nm): | 85 parts |
| Carbon black (average particle size: 100 nm): | 3 parts |
| Nitrocellulose: | 28 parts |
| Polyurethane resin: | 58 parts |
| Copper phthalocyanine dispersing agent: | 2.5 parts |
| Nipporan 2301 (made by Nippon Polyurethane Industry Co., Ltd.): | 0.5 part |
| Methyl isobutyl ketone: | 0.3 part |
| Methyl ethyl ketone: | 860 parts |
| Toluene: | 240 parts |

The above components were prekneaded with a roll mill and then dispersed with a sand mill. Four parts of polyester resin (Vylon 500, made by Toyobo Corp.), 14 parts of polyisocyanate compound (Coronate 3041, made by Nippon Polyurethane Industry Co., Ltd.), and 5 parts of α-Al$_2$O$_3$ (made by Sumitomo Chemical Co., Ltd.) were added and the mixture was stirred and filtered to prepare a back coat layer coating liquid.

<Fabrication of Magnetic Tape>

Simultaneous multilayer coating was conducted in which the above nonmagnetic layer coating liquid was coated on a polyethylene naphthalate resin support—which was 5 μm in thickness, had a centerline surface roughness of the magnetic layer coating surface of 0.001 μm, and had been corona treated in advance to render the base surface hydrophilic—in a manner calculated to yield a thickness upon drying of 1.0 μm, immediately after which the magnetic coating composition for magnetic recording media prepared above was coated thereover in a manner calculated to yield a magnetic layer with a thickness upon drying of 0.1 μm. In a stage when the two layers were still wet state, they were oriented with a cobalt magnet having a magnetic force of 0.5 T (5,000 G) and a solenoid having a magnetic force of 0.4 T (4,000 G) and dried. Subsequently, the above back coat layer coating liquid was coated on the base surface that had been subjected to the corona treatment in advance in a manner calculated to yield a thickness upon drying of 0.5 μm. Subsequently, the product was processed with a seven-stage calender comprised of metal rolls at a temperature of 100° C. at a rate of 80 m/min. The product was then slit to a width of ½ mm to fabricate a magnetic tape.

<Scratch Resistance Test>

The surface of the magnetic layer of the above magnetic tape was subjected to a scratch resistance test with an automated friction and abrasion analyzer (Triboster TS501: made by Kyowa Interface Science Co., Ltd.) in horizontal linear back-and-forth sliding mode under conditions of a contact element: 3 mm φ, sphere load: 3 g, speed: 3 mm/s, measurement count: 10 times back and forth. The surface of the magnetic layer following the test was observed by optical microscopy (magnification: 100 to 500-fold) and scratch resistance was evaluated based on the following scale.

A: No scratches observed on the surface of the magnetic layer
B: Minute scratches observed on the surface of the magnetic layer
C: Deep scratches observed on the surface of the magnetic layer, with component scrapings being deposited on the surface of the magnetic layer.

The results of the above are given in Table 1.

TABLE 1

| | Compound added to magnetic layer | | Results of | Result of durability evaluation | | | |
|---|---|---|---|---|---|---|---|
| | Type | Wt. avg. mol. wt. | evaluation of dispersion property (transmittance) | Rupture energy (J/m$^3$) | Rupture stress (MPa) | Extension at rupture (%) | Result of scratch resistance evaluation |
| Examples 1 | Compound 1 | 7500 | A (2%) | 1900 | 25 | 130 | A |
| Examples 2 | Compound 2 | 7500 | A (2%) | 1850 | 25 | 120 | A |
| Examples 3 | Compound 3 | 2500 | A (2%) | 1850 | 25 | 120 | A |

TABLE 1-continued

| | Compound added to magnetic layer | | Results of evaluation of dispersion property (transmittance) | Result of durability evaluation | | | |
|---|---|---|---|---|---|---|---|
| | Type | Wt. avg. mol. wt. | | Rupture energy (J/m³) | Rupture stress (MPa) | Extension at rupture (%) | Result of scratch resistance evaluation |
| Examples 4 | Compound 4 (R': C₇H₁₅–O–CO–(CH₂)₄–CO–O–)₄ structure | 2500 | A (2%) | 1850 | 23 | 120 | A |
| Examples 5 | Compound 5 (R': C₇H₁₅–O–CO–(CH₂)₄–CO–O–)₄ structure | 6500 | A (2%) | 1800 | 25 | 110 | A |
| Examples 6 | Compound 6 (R'': C₇H₁₅–O–CO–(CH₂)₄–CO–O–)₁₅ structure | 7000 | A (2%) | 1800 | 25 | 110 | A |

TABLE 1-continued

| | Compound added to magnetic layer | | Results of evaluation of dispersion property (transmittance) | Result of durability evaluation | | | |
|---|---|---|---|---|---|---|---|
| | Type | Wt. avg. mol. wt. | | Rupture energy (J/m$^3$) | Rupture stress (MPa) | Extension at rupture (%) | Result of scratch resistance evaluation |
| Examples 7 | Compound 7 | 6500 | A (2%) | 1800 | 23 | 110 | A |
| Comparative Example 1 | None | — | B (80%) | 230 | 69 | 7 | C |
| Comparative Example 2 | Compound 8 | 24000 | B (20%) | 1200 | 25 | 70 | B |

As shown in Table 1, the compound denoted by formula (1), which had a weight average molecular weight ranging from not less than 1,000 and not more than 20,000, enhanced the dispersion of ferromagnetic powder. Further, the magnetic tapes of Examples having magnetic layers containing this compound exhibited good scratch resistance. Based on the values of the rupture energy, stress at rupture, and extension at rupture given in Table 1, Examples were determined to exhibit ready extension (extension at rupture) that was much improved over that of the comparative examples. Thus, the above compounds were thought to play the roles of plasticizers in contributing to enhanced durability (scratch resistance) of the magnetic layer.

Based on the above results, the present invention was determined to make it possible to achieve both improved dispersion of ferromagnetic powder and increased durability of the magnetic layer.

An aspect of the present invention is useful in the field of manufacturing magnetic recording media for high-density recording, such as high-capacity backup tapes.

The present invention is useful in the field of manufacturing magnetic recording media for high density recording, such as in high-capacity backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium, which comprises a magnetic layer comprising ferromagnetic powder and binder on a nonmagnetic support, wherein
the magnetic layer further comprises a compound which has a weight average molecular weight of equal to or more than 1,000 but less than 20,000 and is denoted by formula (1):

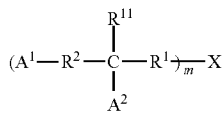

Formula (1)

wherein, in formula (1), $A^1$ denotes a monovalent polymer group having a polyester structure, each of $R^1$ and $R^2$ independently denotes an alkylene group, $R^{11}$ denotes a hydrogen atom or a monovalent substituent, m denotes an integer of equal to or greater than 2, multiple instances of $R^1$, $R^2$, $A^1$, and $R^{11}$ that are present can be identical or different, $A^2$ denotes a hydrogen atom or a monovalent substituent denoted by —$OR^3$—Z, $R^3$ denotes an alkylene group, Z denotes a monovalent acid group which is a carboxyl group, a carboxyl salt group, a sulfonic acid group, or a sulfonate group, among multiple instances of $A^2$ that are present, at least one denotes a monovalent group denoted by —O—$R^3$—Z, and X denotes a connecting group of valence m which comprises a structure selected from the group consisting of a cyclic structure and a branched structure.

2. The magnetic recording medium according to claim 1, wherein the binder has a weight average molecular weight ranging from 20,000 to 120,000.

3. The magnetic recording medium according to claim 1, wherein the ferromagnetic powder has an average particle size ranging from 10 nm to 50 nm.

4. The magnetic recording medium according to claim 1, wherein the magnetic layer comprises the compound which has a weight average molecular weight of equal to or more than 1,000 but less than 20,000 and is denoted by formula (1) in a quantity ranging from 0.5 to 50 weight parts per 100 weight parts of the ferromagnetic powder.

5. The magnetic recording medium according to claim 1, wherein the binder is selected from the group consisting of polyurethane resin and vinyl chloride resin.

6. The magnetic recording medium according to claim 1, wherein the connecting group X in formula (1) is selected from the following connecting groups:

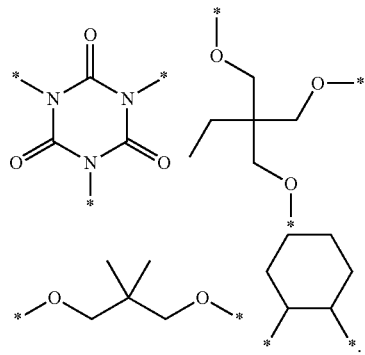

7. The magnetic recording medium according to claim 1, wherein the compound denoted in formula (1) is selected from the group consisting of the following compounds 1 to 7:

Compound 1

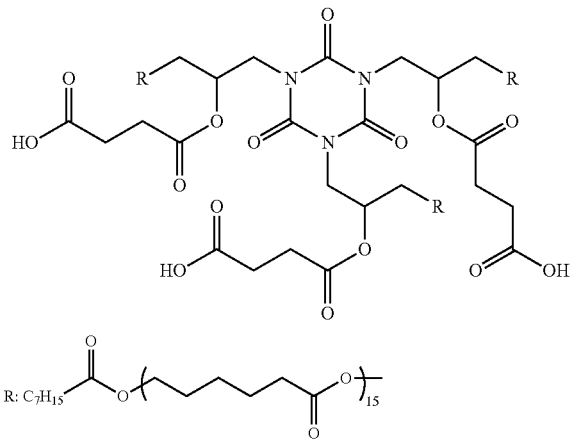

Compound 2

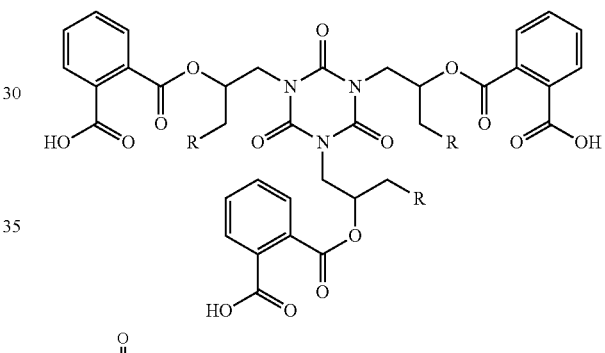

Compound 3

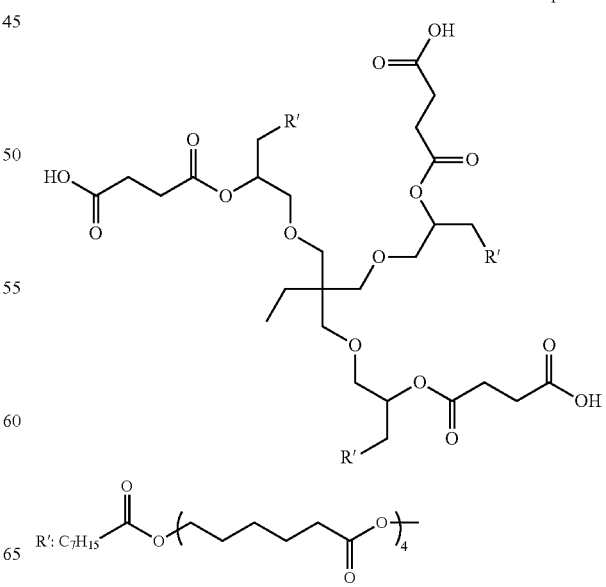

-continued

Compound 4

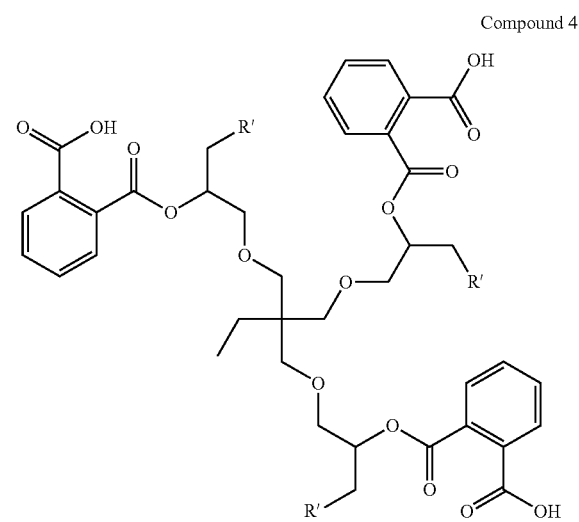

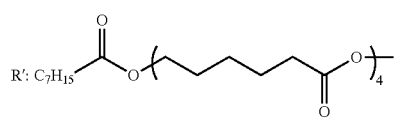

Compound 5

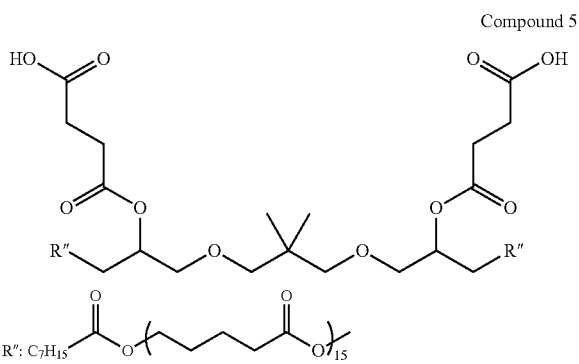

Compound 6

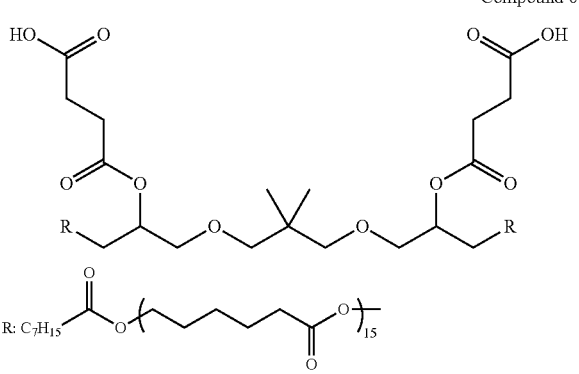

Compound 7

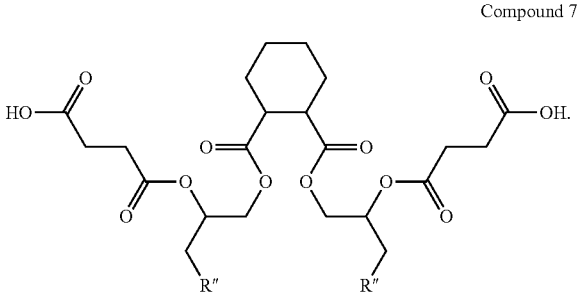

-continued

8. A magnetic coating composition, which is a magnetic coating composition for a magnetic recording medium and comprises:

ferromagnetic powder;

binder;

solvent; and a compound which has a weight average molecular weight of equal to or more than 1,000 but less than 20,000 and is denoted by formula (1):

Formula (1)

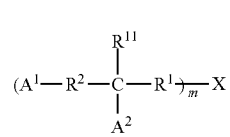

wherein, in formula (1), $A^1$ denotes a monovalent polymer group having a polyester structure, each of $R^1$ and $R^2$ independently denotes an alkylene group, $R^{11}$ denotes a hydrogen atom or a monovalent substituent, m denotes an integer of equal to or greater than 2, multiple instances of $R^1$, $R^2$, $A^1$, and $R^{11}$ that are present can be identical or different, $A^2$ denotes a hydrogen atom or a monovalent substituent denoted by —O—$R^3$—Z, $R^3$ denotes an alkylene group, Z denotes a monovalent acid group which is a carboxyl group, a carboxyl salt group, a sulfonic acid group, or a sulfonate group, among multiple instances of $A^2$ that are present, at least one denotes a monovalent group denoted by —O—$R^3$—Z, and X denotes a connecting group of valence m which comprises a structure selected from the group consisting of a cyclic structure and a branched structure.

9. The magnetic coating composition according to claim 8, wherein the binder has a weight average molecular weight ranging from 20,000 to 120,000.

10. The magnetic coating composition according to claim 8, wherein the ferromagnetic powder has an average particle size ranging from 10 nm to 50 nm.

11. The magnetic coating composition according to claim 8, which comprises the compound which has a weight average molecular weight of equal to or more than 1,000 but less than 20,000 and is denoted by formula (1) in a quantity ranging from 0.5 to 50 weight parts per 100 weight parts of the ferromagnetic powder.

12. The magnetic coating composition according to claim 8, wherein the binder is selected from the group consisting of polyurethane resin and vinyl chloride resin.

13. The magnetic coating composition according to claim 8, wherein the solvent is ketone solvent.

14. The magnetic coating composition according to claim 8, wherein the connecting group X in formula (1) is selected from the following connecting groups:

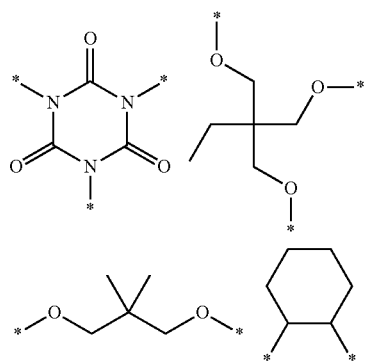
15. The magnetic coating composition according to claim 8, wherein the compound denoted in formula (1) is selected from the group consisting of the following compounds 1 to 7:
Compound 1
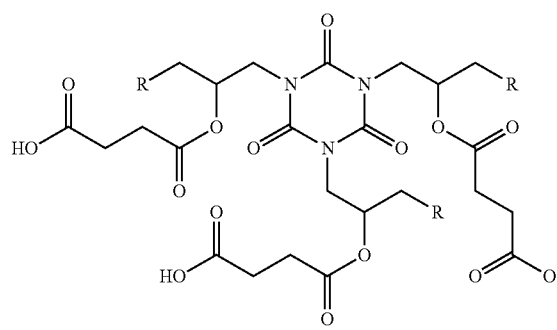
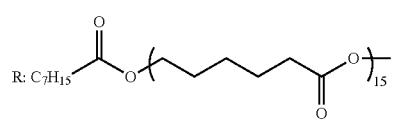
Compound 2
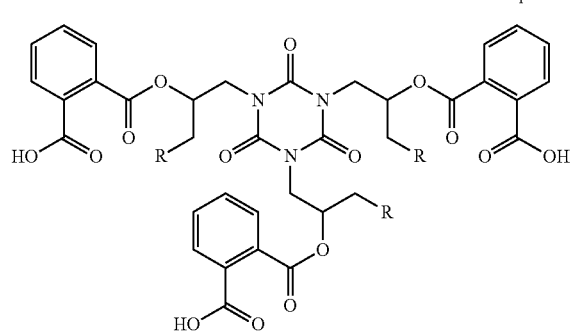
Compound 3
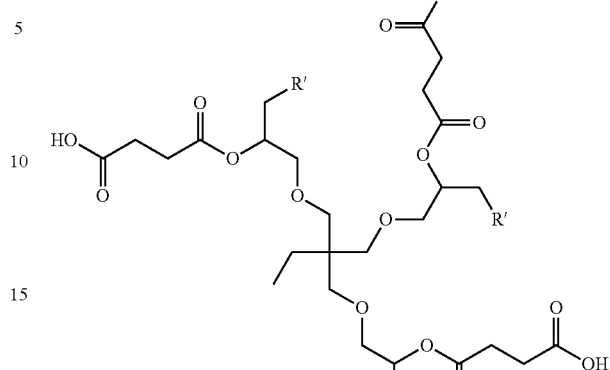
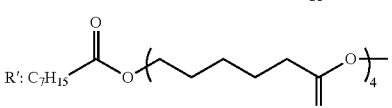
Compound 4
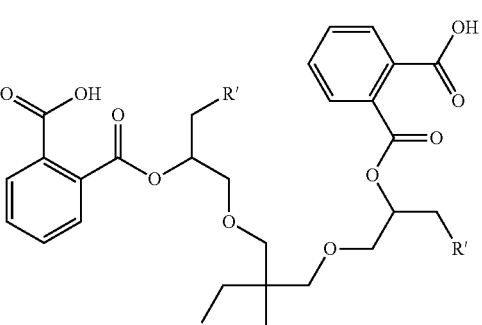
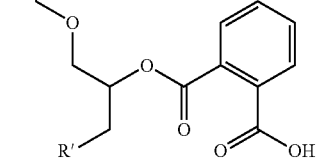
Compound 5
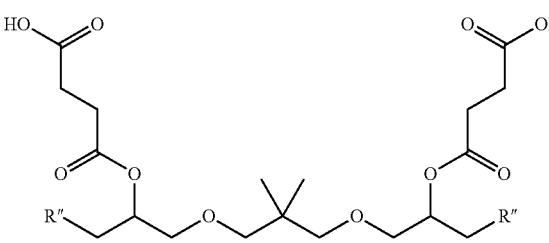
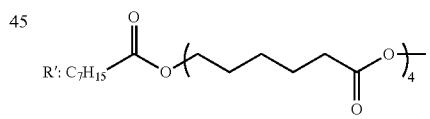
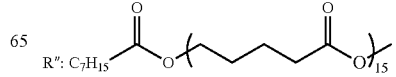

Compound 6
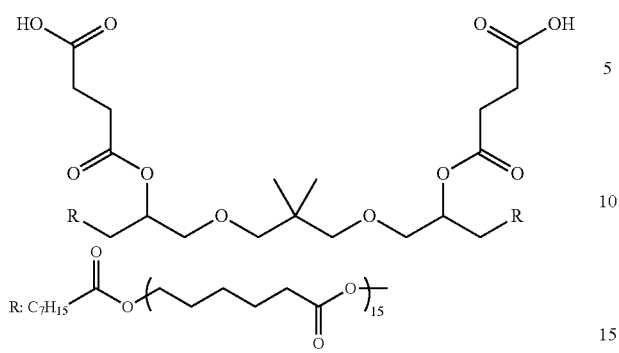
Compound 7
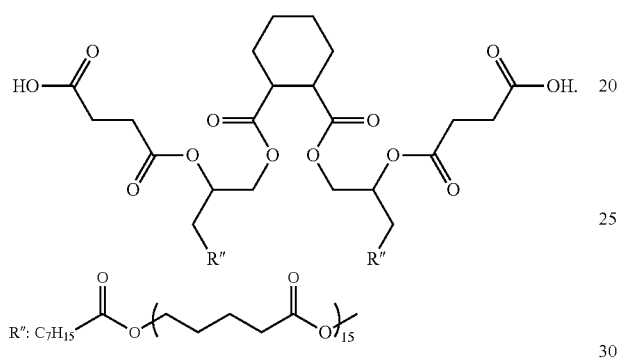
* * * * *